United States Patent
Sae

(10) Patent No.: US 10,463,055 B2
(45) Date of Patent: Nov. 5, 2019

(54) COFFEE CHERRY PROCESSING AND PRODUCTS

(71) Applicant: Bolaven Farms Limited, Yuen Long (HK)

(72) Inventor: Boone Sae, Lantau Island (HK)

(73) Assignee: Bolaven Farms Limited, Yuen Long, N.T. (HK)

(*) Notice: Subject to any disclaimer, the term of this patent is extended or adjusted under 35 U.S.C. 154(b) by 296 days.

(21) Appl. No.: 15/515,313

(22) PCT Filed: Sep. 29, 2015

(86) PCT No.: PCT/IB2015/057446
§ 371 (c)(1),
(2) Date: Mar. 29, 2017

(87) PCT Pub. No.: WO2016/051339
PCT Pub. Date: Apr. 7, 2016

(65) Prior Publication Data
US 2017/0208831 A1    Jul. 27, 2017

(30) Foreign Application Priority Data
Sep. 29, 2014   (HK) .................................. 14109785.4

(51) Int. Cl.
*A23F 5/02*    (2006.01)
*A23F 5/04*    (2006.01)

(52) U.S. Cl.
CPC ................ *A23F 5/02* (2013.01); *A23F 5/043* (2013.01)

(58) Field of Classification Search
CPC .................................. A23F 5/02; A23F 5/043
See application file for complete search history.

(56) References Cited

U.S. PATENT DOCUMENTS

| | | | | |
|---|---|---|---|---|
| 2,210,819 A | * | 8/1940 | Reynolds | A23F 5/14 426/595 |
| 2,227,063 A | * | 12/1940 | Brown | A21D 2/36 426/427 |
| 2,526,873 A | * | 10/1950 | Johnston | A23F 5/02 426/45 |
| 3,686,384 A | * | 8/1972 | Runton | C08L 97/02 264/122 |

(Continued)

FOREIGN PATENT DOCUMENTS

| | | |
|---|---|---|
| CN | 101843284 A | 9/2010 |
| JP | 361100155 | * 5/1986 |
| JP | 2006075105 | * 3/2006 |

OTHER PUBLICATIONS

English Translation for JP361100155 published May 1986.*

(Continued)

*Primary Examiner* — Anthony J Weier
(74) *Attorney, Agent, or Firm* — Harness, Dickey & Pierce, P.L.C.

(57) ABSTRACT

A method for processing coffee cherry is shown herein. The method includes the application of coating material, preferably a granular solid material, to pulped wet coffee or coffee fruit with pulp removed, prior to drying. The method provides expedited uniform drying of coffee cherries and producing coffee free of contaminants and scalable and environmentally friendly. Coffee produced has distinctive desirable taste.

15 Claims, 5 Drawing Sheets

(56) References Cited

U.S. PATENT DOCUMENTS

2006/0263508 A1* 11/2006 Miljkovic ................. A23F 3/34
426/597
2009/0220645 A1* 9/2009 Martinez .................. A23F 5/02
426/45
2010/0247716 A1 9/2010 Castro et al.
2011/0250339 A1* 10/2011 Onishi .................... A23F 5/105
426/546

OTHER PUBLICATIONS

English Translation for JP2006075105 published Mar. 2006.*
International Search Report PCT/ISA/210 for International Application No. PCT/IB2015/057446 dated Jan. 11, 2016.
Written Opinion of the International Searching Authority PCT/ISA/237 for International Application No. PCT/IB2015/057446 dated Jan. 11, 2016.

* cited by examiner

COFFEE CHERRY PROCESSING AND PRODUCTS

CROSS-REFERENCE TO RELATED APPLICATIONS

The present application is a national phase application under 35 U.S.C. § 371 of International Application No. PCT/IB2015/057446, filed Sep. 29, 2015, which claims priority under 35 U.S.C. § 119 to HK 14109785.4, filed Sep. 29, 2014, the entire contents of each of which are hereby incorporated herein by reference.

FIELD OF THE INVENTION

The present invention relates to a method of processing coffee cherry/berries, roasted beans obtain by the processing method and coffee beverages obtained from roasted coffee beans.

BACKGROUND OF THE INVENTION

Coffee is a beverage of choice for many people around the world.

Actually, the commonly known "coffee beans", roasted and used in the brewing of coffee for consumption as a beverage, are dried endosperm, i.e. seeds of coffee cherries. These coffee beans are typically referred to as green coffee beans prior to being roasted.

From the moment ripe coffee cherries are picked from their branches the inherent quality attributes of the respective cherries begin their natural degradation. Therefore, it is most desirable to limit the duration that cherries or wet parchments spend in what is referred to as the "unstable phase" of high "water activity" ($a_w$ 0.8-0.95) by subjecting the wet parchment or coffee cherries to a drying process to reduce the "water activity" of the cherries or wet parchments.

Around the world three processing methods are commonly used to dry post-harvest coffee cherries to shelf stable green coffee beans. Due to distinct differences between these processing methods brewed coffee reflects distinct differences in the overall cup profile/taste.

(Willen J. Boot, "*Wet, dry, and everything in between: Coffee Processing*", Roast Magazine, January/February 2007).

A) The Washed Process, also commonly known as the Wet Process, involves the removal of pulp and mucilage through fermentation and subsequent washing before drying. The process produces a mild coffee with good acidity. The majority of the green beans produced around the world are being produced using this method.

B) In a Pulped Natural Process, also known as the Semi-washed Process, the cherries are pulped, the mucilage is mechanically removed and dried with the parchment. When managed well, this method produces a more distinct coffee than the Washed Process.

C) The Natural Process, also known as the Dry Process, involves the drying of the entire coffee cherry. After drying the entire hull is mechanically removed from the dried cherry to reveal the green beans. This process is hard to manage. When done well it produces a coffee that is much sweeter and has a bigger body (a sensory mouth-feel).

Each of the above drying methods has specific drawbacks that affect the quality of the green bean.

When the duration of the "unstable phase" after picking is prolonged, the wet parchment or the cherries being dried are prone to potential Ochratoxin A (OTA) contamination. OTA is a natural poison that is highly toxic affecting the kidneys and was classified by the International Agency for Research on Cancer as a possible human carcinogen. It is produced by a fungi that affects coffee and other plants such as cereals and cocoa (Food and Agriculture Organization of the United Nations Reference: http://www.fao.org/ag/magazine/0607sp1.htm).

The Wet and Semi-dry processing methods require capital expenditure for equipment and drying facilities. All methods currently in use are extremely labour intensive and often require high skill level which may be lost in the transfer of knowledge from farmer to farmer. Unfortunately, significant deviations from the correct processing steps will affect the green bean, and after being roasted can produce an undesirable taste when brewed.

The Washed and Pulped Natural Process also have associated environmental problems, as they generate environmentally unfriendly effluents. These effluents (wastewater) result in water pollution and can potentially contaminate drinking water. Hence the wastewater needs to be treated adding to the cost of the process. Wastewater treatment presents major problems in developing countries where a significant proportion of coffee is produced.

Accordingly, it is an object of the present invention to provide a processing method which at least partially alleviates or ameliorates at least one or more problems identified with the processing methods discussed above.

Advantageously, it has been found through experiments that the coffee processed by the present invention has properties that are believed to give rise to a distinct taste and aroma, and a highly desired flavour profile, including but not limited to, increased sweetness and reduced bitterness, potentially due to an increased reducing sugar content and a reduced caffeine content in the coffee beans obtained using the processing method.

SUMMARY OF THE INVENTION

Broadly speaking, the present invention has described a method of processing coffee berries, berries obtained from said processing and coffee brewed therefrom, the method comprising: pulping coffee cherries to produce coffee parchments; and at least partially coating the coffee parchments with granular material before drying of the coffee parchment.

According to a preferred embodiment of the present invention, there is provided a method of processing coffee berries wherein the granular material has a particle size in the range of 100-1000μ. Advantageously, the granular material has a particle size of approximately 500μ in diameter.

Preferably, the granular material is neutral or natural-flavour-enhancing material.

Advantageously, the granular material may be selected from the group consisting of sand, coffee mucilage flour, bamboo powder, and a mixture thereof.

Optionally, the drying of the coated coffee parchment may take place on a surface selected from an African Bed or planar cement or in a Solar Dryer.

Advantageously, the coated coffee parchment is allowed to dry in the sun for three days in an average daily temperature range of between 25° C. and 45° C. Preferably, the coated coffee parchment is turned every 30 minutes or every one hour.

Advantageously, the method of processing of coffee beans may include determining either the moisture content or water activity of the coffee parchment; and collecting dried coffee parchment when the predetermined moisture content range and predetermined water activity range have been reached. Preferably, the predetermined moisture content is either <12% or the predetermined water activity of the coffee parchment<$a_w$ 0.7.

In a further aspect of the present invention there is provided green coffee beans produced by coating the pulped coffee parchments with a granular material before drying of the coffee parchments and subsequent milling and grading.

A yet further aspect of the present invention includes Roasted coffee beans obtained by roasting the green coffee beans prepared using the above process.

In a further aspect of the present invention lies in a coffee beverage obtained by grinding the roasted coffee beans prepared by the method of the first aspect of the present invention and infusing these coffee beans with water.

BRIEF DESCRIPTION OF THE DRAWINGS

The present invention is described by the following detailed description of preferred but non-limiting embodiments of the present invention by way of examples and with reference to the accompanying drawings, in which.

DETAILED DESCRIPTION OF THE PREFERRED EMBODIMENTS

1. Definitions

Figure 1:
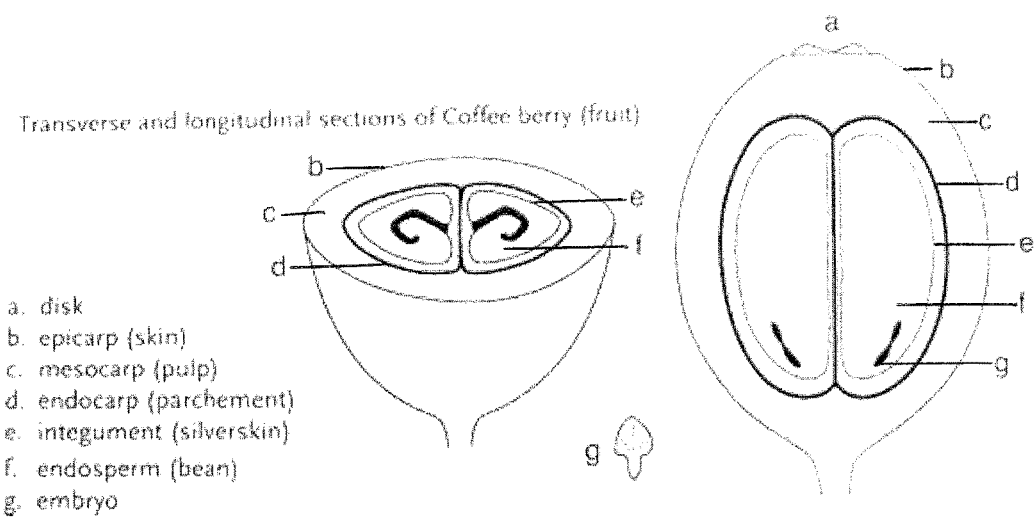
FIG. 1 depicts the typical structure of a red coffee cherry as depicted on the website of Specialty Coffee Associate of America.
Figure 2:
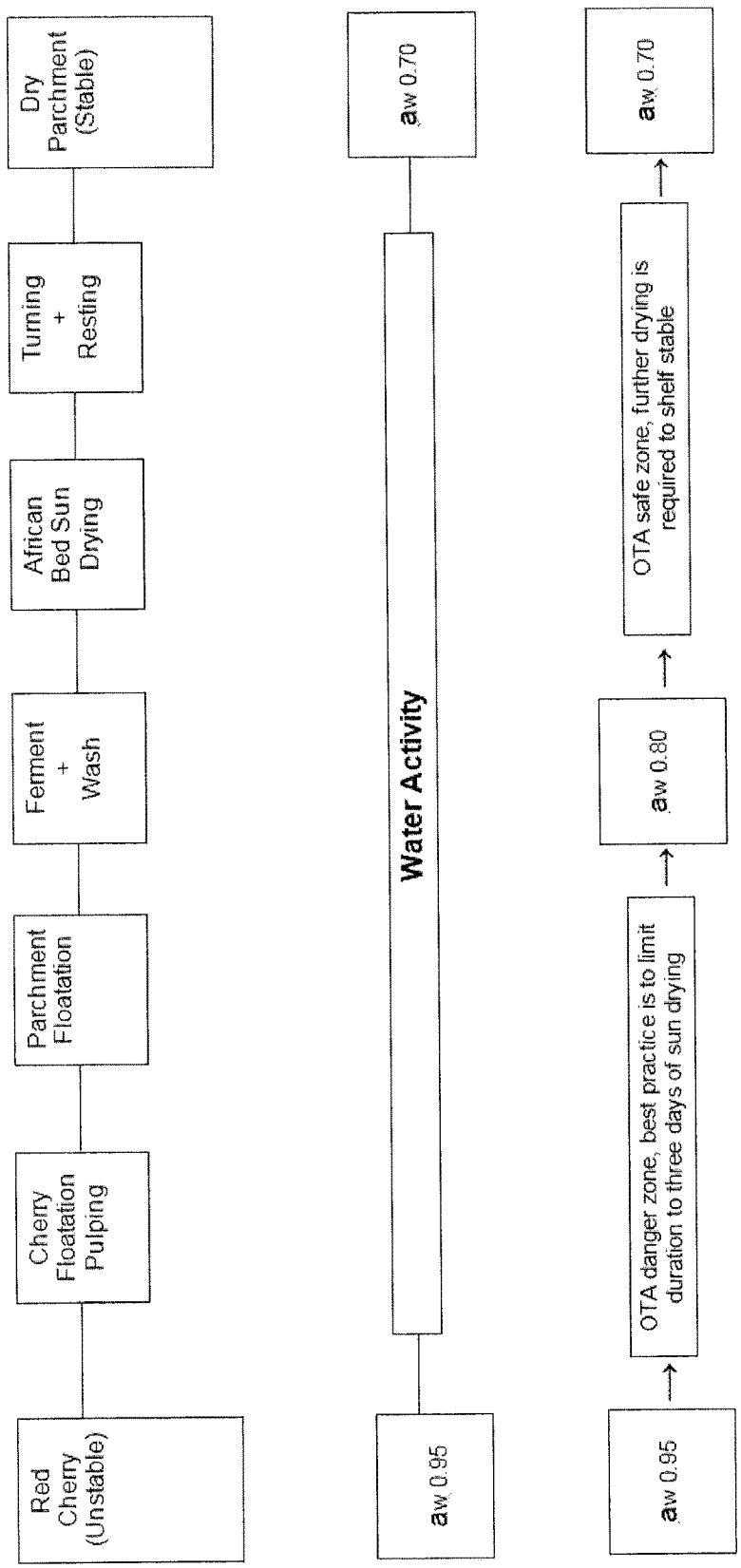
FIG. 2 is a process flow diagram illustrating the processing steps according to the conventional Washed Process.
Figure 3:
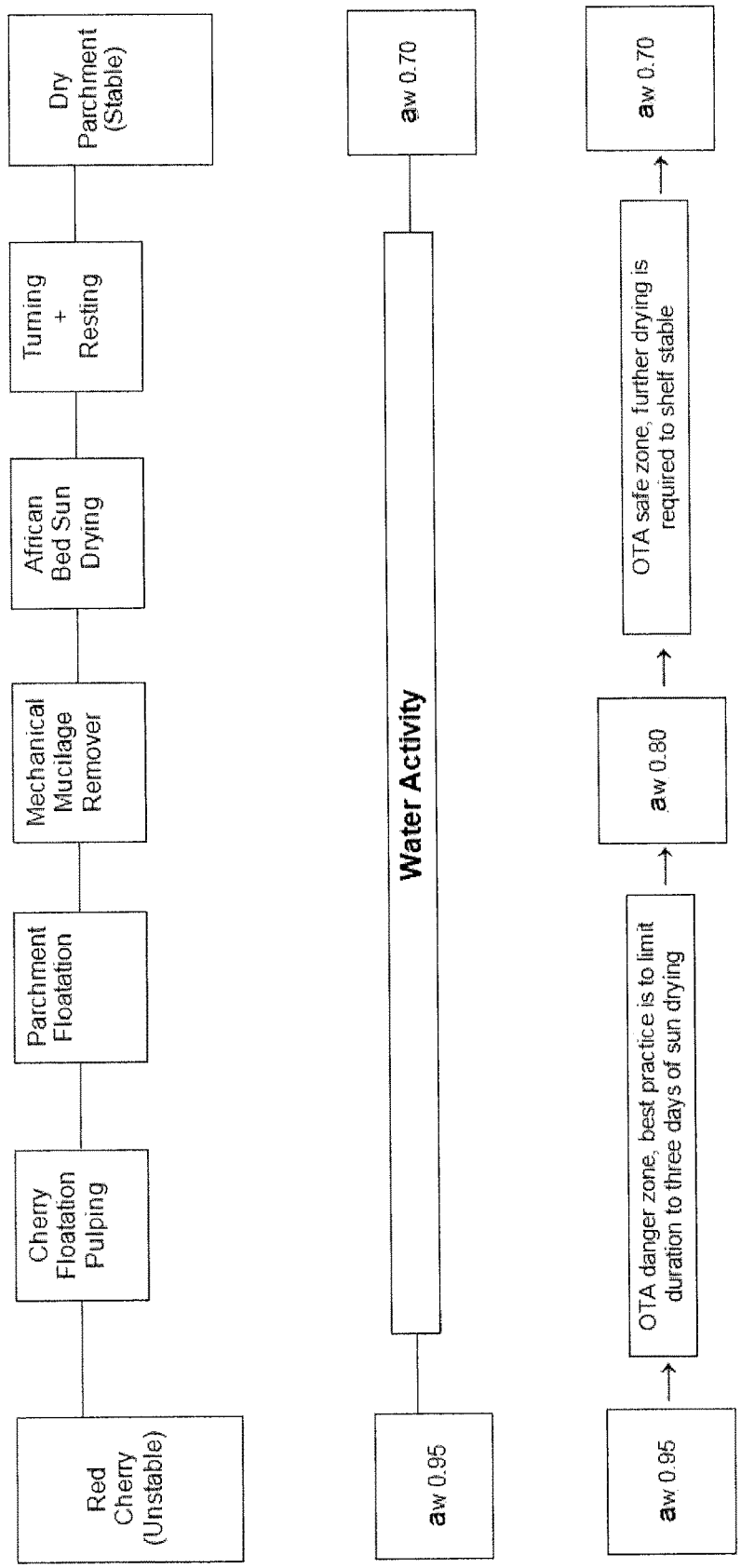
FIG. 3 is a process flow diagram illustrating the processing steps according to the conventional Pulped Natural Process (also known as the Semi-washed Process).
Figure 4:
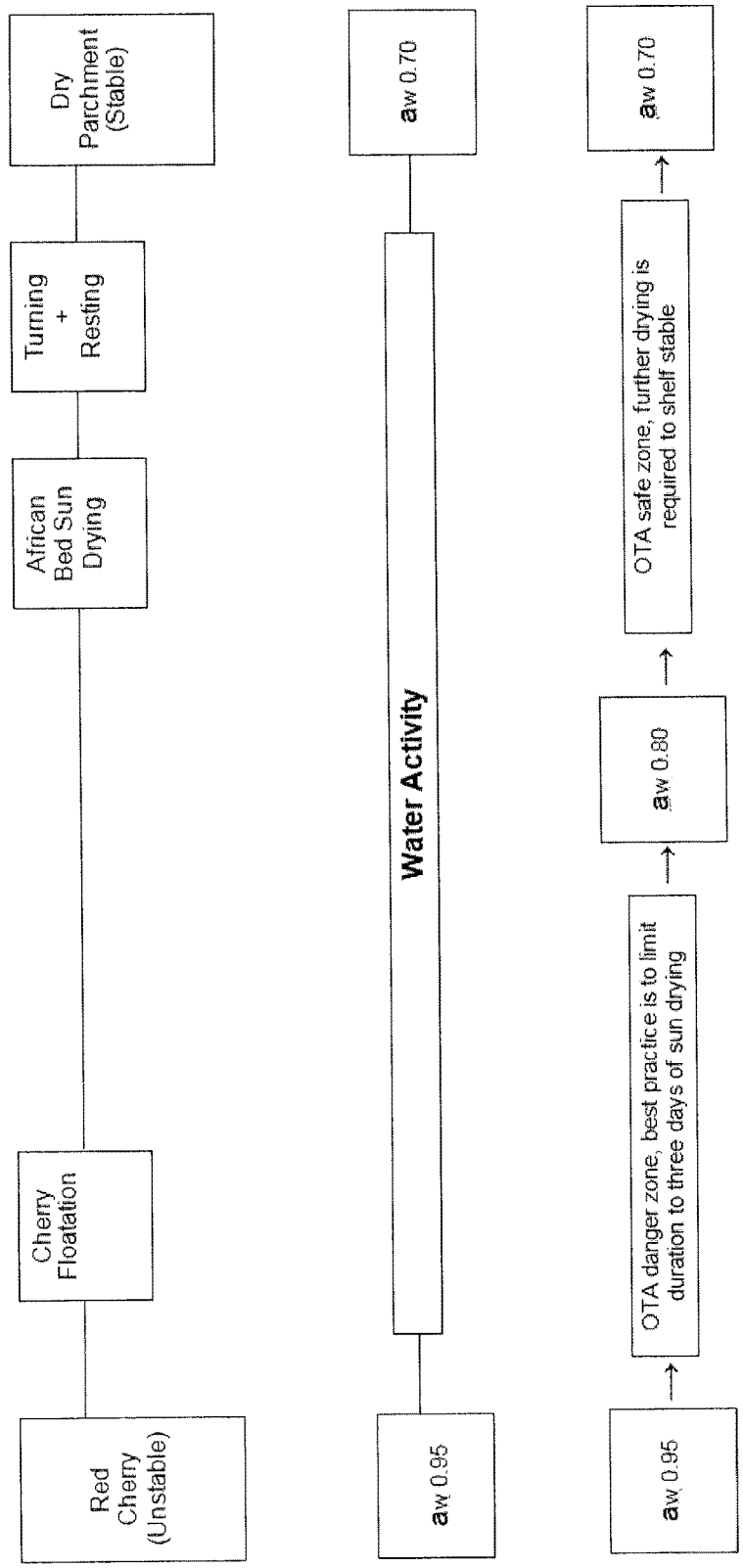
FIG. 4 is a process flow diagram illustrating the processing steps according to the conventional Natural Process (also known as the Dry Process).

The term "coffee" refers to unripe and ripe fresh coffee cherries, also known as coffee berries, coffee fruit, seeds of the coffee cherry, fresh or dried coffee beans, roasted coffee seeds, instant coffee, coffee extract, coffee as a beverage.

The term "coffee bean" refers to the endosperm (seed) of the coffee fruit.

The term "pulp" refers to the part of the coffee cherry including the external exocarp and most of the internal mesocarp (mucilaginous tissue).

The term "parchment" refers to the endocarp of the coffee fruit. The coffee fruit parchment/endocarp is located between the fleshy part (pulp) and the silver skin. It is a thin, crumbly paper-like covering left on wet-processed beans after pulping and fermentation, removed during hulling.

The term "coffee parchment" refers to the processed coffee cherry, which has the pulp removed. This term is commonly used in the field by a person skilled in the art as referring to processed cherries with only the parchment layer and the components within said parchment layer.

The term "pulping" refers to the technological operation used in the washed and semi-washed process to remove the pulp (exocarp) and as much as possible of the mucilage (mesocarp) by mechanical means. A portion of the mucilaginous mesocarp usually remains adhering to the parchment (endocarp).

The term "Water activity ($a_w$)" refers to water present in food that is not bound to food molecules which may support the growth of bacteria, yeast, and mould. It is noted the value of "water activity ($a_w$)" is representative of so-called "unbound water" and this is different from the moisture content of food.

The water activity ($a_w$) of a food item such as a coffee cherry, art etc. is the ratio between the vapour pressure of the food item itself, when in a completely undisturbed balance with the surrounding air media, and the vapour pressure of distilled water under identical conditions. A water activity of 0.80 means the vapour pressure is 80 percent of that of pure water. The water activity of food increases with temperature.

By contrast, the overall moisture condition of a product can be measured as the equilibrium relative humidity (ERH) expressed in percentage or as the water activity expressed as a decimal. Most foods have a water activity of above 0.95.

The term "granular solid material" refers to any artificial and naturally existing material present in the form of granules. In the context of the present invention, this term refers to artificial or naturally existing materials present in the form of granules which could be used to achieve the effect of prohibiting the wet and sticky parchments from clumping together, for enhancing even heat absorption and promoting a timely and uniform drying of the parchments.

Suitable granular solid material can be appropriately determined by a person skilled in the art, and such material may be bought or prepared by granulation methods commonly known in the art. The term also refers to a mixture of solid materials mixed in appropriate ratios, such as 1:10-10:1, and preferably 1:1.

In an embodiment of the present invention, the solid materials are granules of particle size with diameter in the range of 100-1000μ, more preferably, 200-800μ, and most preferably 300-700μ. Throughout the present application, the material is also referred to the coating material, the granular material, the particulate material.

The solid material may be sand particles, coffee mucilage flour, bamboo biochar powder, salt, dolomite lime, rock phosphate, sulfate of potash, saw dust, or a mixture thereof.

The term "coffee mucilage flour" refers to flour milled to particle size of 500μ+/−200μ from sundried pulps of coffee cherries, including pulps (exocarp and mesocarp) of the coffee cherries (usually Arabica) which contains pectin substances, glucose-6-phosphatase, phytochemicals, iron, potassium and protein. By coating wet parchments of Arabica and Robusta with Arabica mucilage flour, the final cup profiles give more fruitiness and an outstanding layering of flavour complexity with sweetness.

The term "bamboo biochar powder" refers to bamboo biochar obtained from the carbonization of bamboo through pyrolysis. Biochar is ground to a particle size of 500μ+/−200μ similar to particle size of sand grains. The antibacterial property of Biochar may aid in preventing the parchments from OTA contamination. It is anticipated the biochar powder will further enhance heat absorption and retention.

2. Coffee Cherry Processing

FIG. 1 depicts the structure of a fresh, unprocessed coffee cherry. The drawing depicts the "pulp" (scientifically known as the exocarp and including the internal mesocarp), the "parchment" (scientifically known as the endocarp of the coffee fruit) and the coffee bean (the seed of the coffee fruit).

The various processes for drying the coffee cherries are set out in the FIGS. 2-5 and discussed below. In particular, FIG. 2 demonstrate the steps involved in the conventional Washed Process, FIG. 3 demonstrate the steps involved in the conventional Pulped Natural Process (also known as the Semi-washed Process), FIG. 4 demonstrates the steps involved in the conventional Natural Process (also known as the Dry Process).

Figure 5:
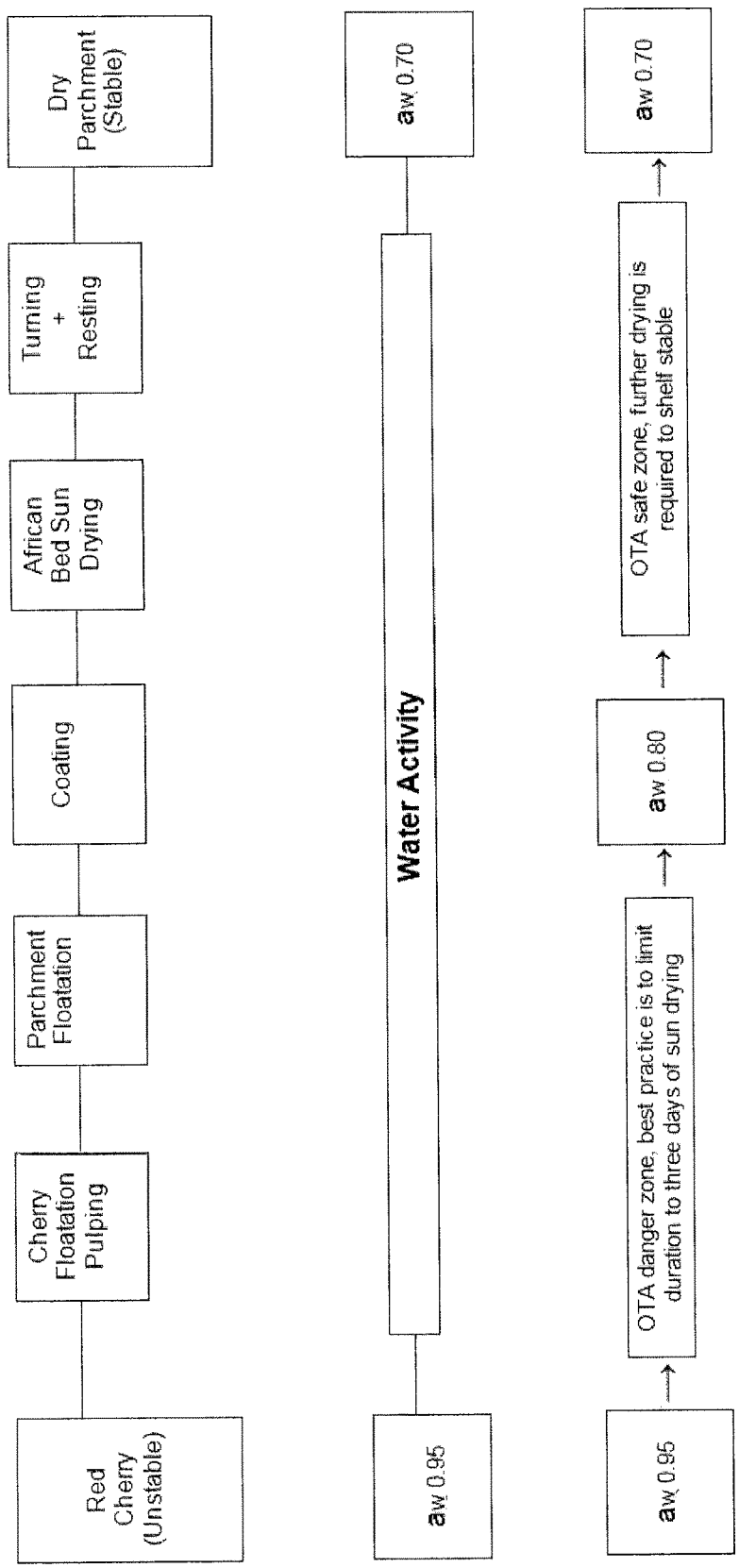
FIG. 5 is a process flow diagram illustrating the processing steps according to the process of the present invention.

FIG. 5 demonstrates the steps involved in the method of the present invention.

The common goal of all of these processes is to obtain shelve stable parchment coffee with "water activity" reduced from high water activity state to a stable state of water activity of maximum $a_w$ 0.70.

General principles allowing a person skilled in the art to carry out the coffee cherry processing method of the present invention are disclosed below. However, it would be appreciated that the present invention is not intended to be limited to the specific embodiments described below.

In accordance with commercially known methods, ripe coffee cherries are selectively harvested, e.g. by hand picking by trained pickers, or with aid of mechanical means. After visual inspection, the qualified fresh cherries are subjected to first floatation by placing the cherries into the floatation tank to skim off "floats". A paddle can be used to agitate the cherries in the tank, to ensure all "floats" rise to the top. As is known in the art, the floats are typically insect attacked or otherwise poor quality cherries. Heavy cherries (at the bottom) are then transferred to the pulping machine by methods known to a person skilled in the art. In an exemplary technique, a durable polyethylene mesh net can be used as liner in the floatation tank, such that the heavy cherries could be retrieved in one lifting.

The retrieved heavy cherries are then pulped using a conventional pulping machine whereby the pulp (exocarp) of the cherries is removed, exposing the parchment of the cherry. The processed cherry obtained is referred herein as the "coffee parchment" or the "parchment".

The freshly pulped parchments (i.e. the wet parchments or the freshly pulped coffee beans with the parchment layer) are subjected to second floatation by introduction into the floatation tank to further skim off any "floats". A paddle may be used to agitate the wet parchments in the tank, to ensure all floats rise to the top. Again, the floats are skimmed off to retrieve the heavy parchments at the bottom. In an exemplary embodiment, a durable polyethylene mesh net can be used as liner in the floatation tank such that the heavy parchments could be retrieved in one lifting.

The retrieved heavy parchments are rinsed with fresh clean water, strained and coated with the coating material. In accordance with the present invention as is discussed below.

Coating Procedure:

In accordance with an embodiment of the present invention, the wet parchments may be coated with granular materials by any commonly known coating method, which can be either manual or mechanical.

The ratio of coating material to wet parchments may be readily adjusted to obtain the optimal result by a person skilled in the art, preferably in coating ratio of 10-30:1, and more preferably 20:1 (coating material to wet parchments).

In one embodiment, wet parchments are placed in containers capable of holding up to 50 kg of wet parchment and mixed in the dry coating material of choice by hand to coat every parchment with the coating material.

In an alternative embodiment, the wet parchments are placed in a clean motorised cement mixer, with no more that 75% of the mixer's volume used, dry coating material is added and mixed well to ensure that every parchment is coated.

For either method the coated wet parchments are then subjected to commonly known drying processes. In a preferred embodiment, the coated wet parchments are transferred to African beds/cement patio/GrainPro Solar Dryer to dry in a maximum 3 cm thick layer for the first three days.

Using a Moisture Meter or Water Activity Meter (e.g. using humidity probes from Rotronic), readings of either the moisture content or the water activity of the parchments may be taken during the drying process, preferably at the beginning as well as at the end of each drying day.

The drying step is completed when the either 12% of bean moisture content or water activity of $a_w$ 0.70 has been achieved. The thickness of the layer is expected to increase to 5 cm starting from the fourth day of sun drying.

In another embodiment, the drying parchments are turned every thirty minutes throughout the first three days, and turned every hour thereafter, in order to ensure uniform drying of the parchments.

In a further embodiment, parchments are gathered into piles on the African beds at twilight, covered with plastic sheets, to retain heat, promote internal water migration and to protect the parchments from rewetting, dew and occasional rain.

The dry parchments are settled for preferably at least 30 days in a suitable container (such as a grain bag). Suitable containers and grain bags, include containers obtained from GrainPro, Inc. (GrainPro SGB-HC III or the SVC Cocoons) or settling bins and can be appropriately selected by a person skilled in the art.

When the settling period is complete, the parchments can be milled, sorted and graded for export as green coffee beans.

3. Effects of Coating of Coffee Parchment

By coating the wet parchments with a neutral or natural-flavour enhancing material, it reduces the chances of the wet and sticky coffee parchments being clumped together while sun drying. This promotes timely and uniform drying, which helps to prevent unfavourable taints associated with over-fermentation.

The granular coating material enhances more even heat absorption and promotes a timely and uniform drying of the parchments. Additionally, the coating material enhances heat retention within the parchments, promoting internal cellular water migration toward equilibrium overnight.

It should be noted that the OTA contamination danger zone is highest at $a_w$ 0.8 to $a_w$ 0.95 hence the time coffee is in this state should be no more than 3 days.

After three days of sun drying with the granular materials, it is anticipated that the $a_w$ readings are below $a_w$ 0.8 (i.e. below the OTA contamination danger zone), which means that the contamination risk is substantially reduced and no longer a critical factor, thereby increasing food safety. In particular it is noted that at maximum $a_w$ 0.7 the product has become shelf stable.

Additionally, by retaining much of the mucilage (mesocarp) on the wet parchments, the final "cup profile" of coffee prepared with the resulting coffee beans has a creamy body with an increased fruitiness and sweetness, which is believed to be a result of an increased amount of reducing sugar and a reduction in caffeine content of the coffee beans.

The claimed method is simple, repeatable and scalable, allowing coffee with optimized quality to be obtained in a consistent manner.

Depending on the geographic location and the prevalent climate at the time of harvest rain and high humidity will affect the sun drying rate. The current coffee industry sun drying norms are Wet Process: 10 to 20 days
Pulped Natural: 15 to 25 days
Natural: 20 to 30 days In arid areas, like Yemen and Ethiopia, the drying rate is faster and as a result the drying period is likely to be reduced.

As the presently claimed process greatly reduces the drying time and removes the need to soak, ferment and wash the parchments, the labour cost involved in drying the coffee cherries can be reduced by over 50%. The present method does not involve mechanical mucilage removal, requires minimal machinery assistance, and therefore reduces capital expenditure involved in the drying process.

Further, the process addresses environment concerns related to coffee effluents as the claimed method reduces coffee effluents by 80% as compared to the Washed Process. Other benefits include the use of economical and reliable sources of coating materials, such as sand, which is abundant in most coffee producing countries.

EXAMPLES

Coating Materials Used

Four materials are chosen and tested independently to coat the wet coffee parchments, coating ratio of 1 to 20 is applied (coating material to wet parchments):

a. Freshwater sand (particle size-500μ+/−200μ) sifted, rinsed and sun dried;
b. Marine sands (particle size-500μ+/−200μ), sifted, rinsed and sun dried;
c. Coffee (Arabica) mucilage flour and freshwater sands mixture (1 to 1 ratio),
d. Bamboo biochar powder (particle size approx. 500μ+/−200μ) and freshwater sands mixture (1 to 1 ration).

Method Steps
After Crop Examination
Step 1-Selective picking by trained pickers. Start earliest possible, finish at noon.
Step 2-Incoming cherries to ensure that 97%< ripe cherries are harvested, the cherries are subjected to processing immediately.
Step 3-Cherry floatation to skim off floats. Heavy cherries are pulped immediately. Clean pulping machine thoroughly.
Step 4-Parchment floatation to skim off floats. Heavy parchments rinsed, strained, coated with coating materials a. to d.
Step 5-Coated parchments to dry on African beds. 3 cm thick layers first 3 days, thereafter 5 cm.
Step 6-Drying parchments are turned every 30 minutes. Turning hourly starting the 4th day.
Step 7-Heap parchments into piles and cover with plastic sheet overnight.
Step 8-Drying is complete when the moisture content is either <12% or the water activity<$a_w$ 0.7.
Step 9-Dry parchments are settled for 30 days minimum in GrainPro SGB-HC III with flushing with $CO_2$ being optional-.

Cupping Results (Sensory evaluation)

In order to determine the overall cup profile/taste of the coffee prepared with coffee beans processed by the method of the present invention, coffee samples were reviewed by experts associated with the Specialty Coffee Association of America (SCAA) (http://www.coffeecuppers.com/AboutUs.htm).

The coffee samples were prepared and evaluated accord to the standard cupping protocols set out by the SCAA, commonly adopted within the industry of specialty coffee (http://www.scaa.org/?page=resources&d=cupping-protocols).

In two Independent cupping reports, Arabica processed using the method of the present invention was rated at 89.1 by Bob Yellin, whereas Robusta processed according to the method of the present invention was rated at 84.0 by Bob Yellin and Jim Schulman.

According to the Scoring Key provided by SCAA as shown below, Arabica coffee processed using the method of the present invention is classified as having "Excellent" quality, whereas Robusta processed according to the method of the present invention is classified as having "Very Good" quality, with both coffee samples tested falling within the class of "Specialty" coffee.

| Total Score Quality Classification | | |
|---|---|---|
| 90-100 | Outstanding | Specialty |
| 85-89.99 | Excellent | |
| 80-84.99 | Very Good | |
| >80.0 | Below Specialty Quality | Not Specialty |

("Scoring Key" obtained from http://www.scaa.org/?page=resources&d=cupping-protocols; revised 23 Jan. 2013)

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

The invention claimed is:

1. A method of processing coffee cherries comprising:
   pulping the coffee cherries to produce coffee parchments;
   coating the coffee parchments with a granular material to produce coated coffee parchments, the granular material selected from the group consisting of sand, coffee mucilage flour, bamboo powder, and a mixture thereof; and
   drying the coated coffee parchments.

2. The method of processing of claim 1, wherein the granular material has a particle size in a range of 100-1000μ.

3. The method of processing of claim 1, wherein the granular material has a particle size of approximately 500μ in diameter.

4. The method of processing of claim 1, wherein the granular material is a neutral or natural-flavour-enhancing material.

5. The method of processing of claim 1, wherein the drying of the coated coffee parchments is performed on a surface of an African bed or planar cement or in a solar dryer.

6. The method of processing of claim 5, wherein the drying of the coated coffee parchments includes exposure to the sun for three days at an average daily temperature range of between 25 C and 45 C.

7. The method of processing of claim 5, further comprising:
   turning the coated coffee parchments every 30 minutes.

8. The method of processing of claim 1 further comprising:
   determining a moisture content or a water activity of the dried coffee parchments; and
   collecting the dried coffee parchments when a threshold of the moisture content or the water activity has been reached.

9. The method of processing of claim 8, wherein the collecting is performed when the moisture content is <12% or the water activity is <$a_w$ 0.7.

10. Green coffee beans produced by coating pulped coffee parchments with a granular material before drying of the coffee parchments and subsequent milling and grading, the granular material selected from the group consisting of sand, coffee mucilage flour, bamboo powder, and a mixture thereof.

11. Roasted coffee beans obtained by roasting the green coffee beans of claim 10.

12. A coffee beverage obtained by grinding the roasted coffee beans of claim 11 and infusing these with water.

13. The method of processing of claim 5, further comprising:
   turning the coated coffee parchments every hour.

14. The method of processing of claim 6, further comprising:
   turning the coated coffee parchments every 30 minutes.

15. The method of processing of claim 6, further comprising:
   turning the coated coffee parchments every hour.

* * * * *